H. H. WILLIAMS.
PROCESS IN THE MANUFACTURE OF GENERATING PLATES FOR X-RAY MACHINES.
APPLICATION FILED AUG. 19, 1908.

914,623.

Patented Mar. 9, 1909.

Witnesses:
William C. Smith
D. O. Barrett.

Inventor:
Henry H. Williams,
By Joshua R. H. Potts
Attorney.

UNITED STATES PATENT OFFICE.

HENRY H. WILLIAMS, OF CHICAGO, ILLINOIS.

PROCESS IN THE MANUFACTURE OF GENERATING-PLATES FOR X-RAY MACHINES.

No. 914,623.  Specification of Letters Patent.  Patented March 9, 1909.

Application filed August 19, 1908. Serial No. 449,335.

*To all whom it may concern:*

Be it known that I, HENRY H. WILLIAMS, a citizen of the United States, residing at Chicago, county of Cook, and State of Illinois, have invented certain new and useful Improvements in the Process in the Manufacture of Generating-Plates for X-Ray Machines, of which the following is a specification.

My invention relates to the process of manufacturing generating plates for X-ray machines, and more particularly to the process of shellacking the glass disk or core of the plate.

In the art of plate making it is generally conceded that owing to certain peculiar and desirable qualities of orange shellac that it is the best substance to use as a plate coating, but hitherto it has been considered necessary to dissolve the shellac in alcohol before applying the same to the glass core of the plate.

The usual process consists in applying a solution of shellac and alcohol and then subjecting the coated plate to a high temperature by placing the same in an enameling oven, which causes a large percentage of the alcohol to be thrown off. A small quantity of alcohol, however, remains in the coating after the plate is finished, and because of this fact, certain difficulties hereinafter described are experienced in the use of the ordinary plate.

It is well known that alcohol has an affinity for water, hence, when a plate-coating contains alcohol, moisture collects on the plate if the atmosphere is at all humid. The efficiency of the plate is thus impaired, as a dry plate is necessary for the best results. Moreover, with alcohol present in the coating of the plate it cannot be washed off with water without spotting and producing other injurious results.

To overcome the above mentioned difficulties is the object of my invention, and a further object is to render the plate more efficient by providing a rough surface on each side thereof. It may be remarked that because of the roughened surface of the plates that a much larger spark may be obtained than is possible to obtain from a machine equipped with the ordinary smooth plates.

Further objects will appear hereinafter.

With these objects in view my invention consists in the steps hereinafter described and later specifically defined in the appended claims.

My invention will be more readily understood by reference to the accompanying drawings forming a part of this specification, and in which—

Figure 1:
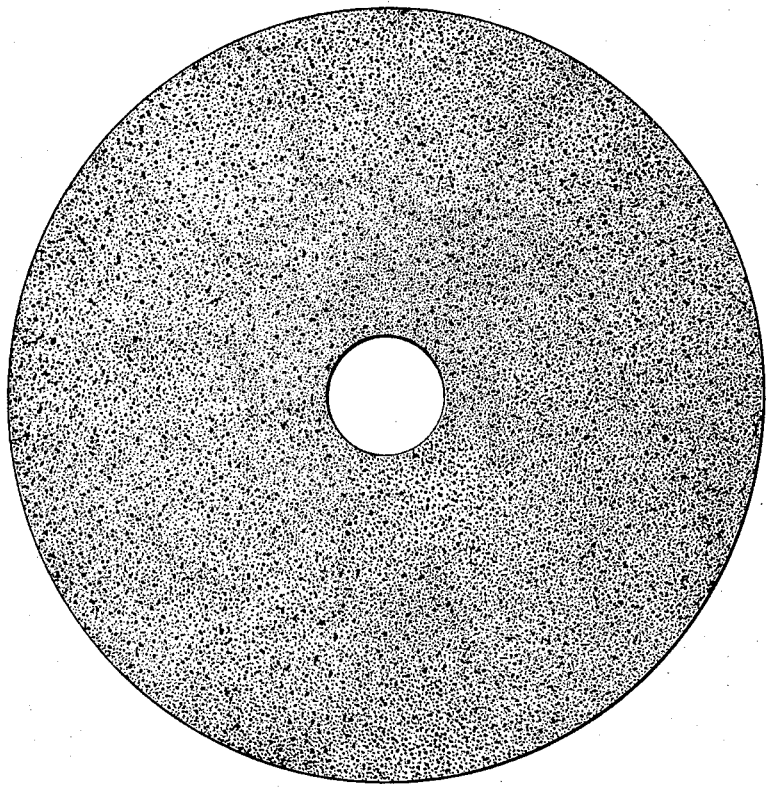
Figure 2:
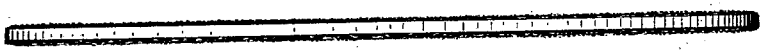

Figure 1 is a side elevation of a generating plate as produced by my improved process, and Fig. 2 is a bottom elevation of the same.

In the drawings the roughness of the shellac coating on the glass core of the plate is plainly discernible.

The first step in the process consists in applying shellac in a granulated form to the surface of the glass core after the same has been heated sufficiently for the granules of shellac to adhere temporarily. The plate is then subjected to a high temperature in an enameling oven or other suitable heating apparatus. The result is a plate having a firm homogeneous coating free from alcohol or other objectionable substances and having the desired roughness of surface. In the process of baking in the enameling oven the particles of shellac become thoroughly adhered to the glass core, and the finished plate may be readily washed to remove deposits of soot or carbon or other foreign matter that may form on the plate.

Having described my invention what I claim as new and desire to secure by Letters Patent, is:

1. In the manufacture of X-ray generating plates, the process consisting in subjecting the glass disk or core of the plate to a high temperature, in applying dry granulated shellac or a substance of a similar nature to said core when in a heated condition, and in subjecting the glass core with the particles of shellac temporarily adhered thereto to a high temperature in an enameling oven or other heating apparatus, whereby a solid incrustation is formed on the glass core, substantially as described.

2. In the manufacture of X-ray generating plates, the process consisting of reducing orange shellac to a granulated form, in applying the granulated shellac to the glass core of the plate which has been previously heated, and in subjecting the glass core with its temporary coating of shellac to a high temperature a length of time sufficient for the particles of shellac to become thoroughly adhered to the glass core, whereby a plate having a firm homogeneous coating free from alcohol or other fluids and having a rough hard surface is formed, substantially as described.

In testimony whereof I have signed my name to this specification in the presence of two subscribing witnesses.

HENRY H. WILLIAMS.

Witnesses:
 WM. C. SMITH,
 JANET E. HOGAN.